3,560,584
PROCESS FOR DEALKYLATING HYDROCARBONS

Pierre Duhaut, Le Vesinet, and Jean Francois Le Page, Rueil Malmaison, France, assignors to Institut Francais du Petrole des Carburants et Lubrifiants, Rueil Malmaison, Hauts-de-Seine, France
No Drawing. Filed Dec. 13, 1968, Ser. No. 783,708
Claims priority, application France, Dec. 20, 1967, 133,224
Int. Cl. C07c 3/58; B01j 11/06
U.S. Cl. 260—672   7 Claims

ABSTRACT OF THE DISCLOSURE

A process for hydrodealkylating alkylaromatic hydrocarbons which consists of passing said hydrocarbons over a catalyst in the presence of hydrogen, said catalyst composed of 1 to 20% by weight of compounds of metals from Group I–A and 0.01 to 5% by weight of compounds of metals from Group VI–A deposited on an alumina, said alumina having a specific surface between 40 and 120 m.²/g., a porous volume between 0.4 and 0.8 cc./g., and more than 75% of the porous volume corresponding to pores having a diameter between 100 and 2,000 A., said alumina also exhibiting a substantially null acidity.

BACKGROUND OF THE INVENTION

This invention relates to an improved process for dealkylating hydrocarbons and more particularly for the catalytic hydrodealkylation of the same in the presence of hydrogen.

The importance of such a process, providing for the conversion of alkyl aromatic hydrocarbons to aromatic hydrocarbons, is well known in the art.

The reaction mechanism is as follows:

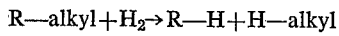

R—alkyl+H$_2$→R—H+H—alkyl wherein R is an either saturated or unsaturated, linear, cyclic or an aromatic hydrocarbon radical.

A number of processes for carrying out this reaction either partially or completely, have been already proposed. For instance U.S. Pat. No. 2,386,969 filed on Nov. 19, 1943, describes a process for dealkylating polyalkylaromatic hydrocarbons by passing the same or a mixture of several hydrocarbons over a catalyst formed of a carrier impregnated with a compound of an element from Group VI–A of the periodical classification of elements and more particularly a compound of chromium or molybdenum.

However these various processes as already proposed have not been entirely satisfactory since they require too severe conditions of operation and/or they resulted in too poor yields.

The improved process which is an object of this invention avoids the above-mentioned inconveniences.

The hydrodealkylation process, object of this invention, compirses contacting a hydrocarbon charge containing one or more alkylaromatic hydrocarbons, with hydrogen, in the presence of a catalyst obtained by incorporating elements from Groups I–A and VI–A of the periodical classification, in an alumina having a specific surface comprised between 40 and 120 m.²/g. (preferably between 40 and 100 m.²/g.), a porous volume comprised between 0.4 and 0.8 cc./g., and wherein more than 75% and preferably more than 90% of the porous volume corresponds to pores of a diameter between 100 and 2,000 A., said alumina furthermore exhibiting a substantially null acidity.

By substantially null acidity it is understood an acidity lower than 0.07 calorie per square meter at 400° C. under a reduced pressure of 300 mm. of mercury.

The test consists of placing the alumina in the presence of ammonia and measuring, by differential thermal analysis, the heat evolved as a result thereof.

It has been observed that only the catalysts of the above-described type provide the advantages according to the invention. A catalyst which contains, for instance the same active elements (elements from Groups I–A and VI–A), in the same amounts, but prepared from an alumina which does not exhibit the above-mentioned characteristics, provides, in fact, results which are not so good.

The alumina which may be used according to the invention, can be prepared in different manners, for instance according to the processes described in French Pat. 1,386,364 and 1,449,904, filed respectively on Dec. 2, 1963 and July 9, 1965.

These processes consist of treating an alumina of high specific surface with water in an autoclave at a temperature in the range of about 120–250° C. in the presence or the absence of an acid. The alumina is then calcinated.

In this manner the specific surface is decreased while increasing the macroporous volume and maintaining a good mechanical strength. Moreover, the acidity of such an alumina is generally very low.

As elements from Group VI–A which can be used for impregnating the carrier, are to be mentioned in particular, chromium, molybdenum and tungsten, these elements being present in the carrier preferably in the form of their oxides.

It has been observed that the best results were obtained with the use of catalysts containing chromium.

The catalyst also contains an alkaline element (element from Group I–A such as for example, sodium, potassium, rubidium, generally in the form of the corresponding oxide). Potassium is, however, preferred as the alkaline element.

The catalyst to be used according to the invention will contain by weight 1 to 20% of the element from Group VI–A and 0.01 to 5% of the element from Group I–A, these percentages being relative to the oxide, and the remaining part consisting essentially of alumina.

The preferred amounts of these respective oxides are preferably 5 to 12% and 0.5 to 2%. The catalyst may also contain other components, for instance an element from the iron group, such as cobalt or nickel, at a relatively low concentration (lower than 5% by weight of the corresponding oxide).

The catalyst is prepared in a conventional manner. Alumina is impregnated with an element from Group VI–A in the form of a compound which is decomposed by heat to an oxide, for example a nitrate, an acetate, a citrate, an oxalate and the like.

Similarly the second impregnating solution will contain a precursor of an alkaline metal oxide, for example a potassium or sodium carbonate or bicarbonate or a hydroxide, such as sodium or potassium hydroxide.

The impregnation of elements from Groups I and VI–A may be carried out by means of two separate solutions or of a single solution containing the two compounds, for example, chromium nitrate and potassium nitrate.

When the carrier is impregnated with two separate solutions it is preferable to make use in a first stage of the solution containing the compound from Group VI and after drying, in a second stage, of the solution containing the alkaline element.

The alumina which has been impregnated with the solution(s) is then dried, for instance at a temperature of about 120° C. to 200° C., and thereafter calcinated, for example between 400° C. and 750° C.

The hydrodealkylation process according to the invention may be used for the treatment of any charge containing one or more alkylaromatic hydrocarbons, said charge optionally containing also paraffins, naphthenes, olefins and acetylenic hydrocarbons. The presence of sulfur compounds as well as polyaromatic compounds is not troublesome.

By way of example, the process may be used for dealkylating toluene, xylenes, ethylbenzene and isopropylbenzene.

The alkylaromatic hydrocarbons may be diluted with different compounds which are inert with respect to the reaction, such as nitrogen, steam, methane, a rare gas, carbon dioxide and the like.

The operating conditions for the hydrodealkylation are preferably the following: pressure between 10 and 70 kg./cm.$^2$, temperature between 500° C. and 800° C., VVH (volume of liquid charge per volume of catalyst and per hour) between 0.5 and 2, molar and ratio, hydrogen/alkylaromatic hydrocarbons in the charge, between 5 and 15.

When the charge contains sulfur compounds, the product obtained by hydrodealkylation may be advantageously desulfurized for example by passing the same in the presence of hydrogen over a catalyst containing cobalt and molybdenum.

The following non limitative examples are given for the purpose of further illustrating the invention.

EXAMPLE I

A catalyst is prepared by impregnating an alumina with an aqueous solution of chromium nitrate $Cr(NO_3)_3$, $9H_2O$, thereafter drying at 150° C. for 4 hours, again impregnating with a potassium hydroxide solution, again drying for 4 hours at 150° C. and calcinating for 4 hours at 750° C.

The alumina carrier exhibited, before impregnation, the following characteristics:

specific surface: 70 m.$^2$/g.
porous volume: 0.6 cc./g., 90% of which corresponds to pores of a diameter between 200 and 1, 800 A.
acidity measured in calories/m.$^2$ (at 400° C.): 0.02

The resulting finished catalyst contains by weight:

|  | Percent |
|---|---|
| $CR_2O_3$ | 7.5 |
| $K_2O$ | 1 |

A charge is passed over this catalyst under the following operating conditions:

total pressure: 45 kg./cm.$^2$
temperature: 630° C.
VVH: 1 volume of liquid charge per volume of catalyst and per hour
relative hydrogen feeding rate: 8.5 moles per mole of hydrocarbon in the charge The respective compositions of the charge and the outflow from the hydrodealkylation zone are given in Table I below.

TABLE I

| Composition by weight percent | Charge | Outflow |
|---|---|---|
| n-Hexane | 0.5 | |
| Benzene | 4 | 68.5 |
| Toluene | 70 | 27 |
| Ethylbenzene | 17 | 1. |
| Xylene | 8.5 | 1.5 |
| Heavy products [1] | | 2 |

[1] The heavy products are polyaromatic hydrocarbons such as diphenyl, acenaphthene and fluorene.

EXAMPLE II

Example I is repeated with a catalyst prepared in the same manner but containing 15% by weight of chromium oxide $Cr_2O_3$ and 1% of $K_2O$. A charge identical to that of Example I is treated under the same conditions but at three different temperatures. The results are as follows:

| Reaction temperature | 570° C. | 600° C. | 630° C. |
|---|---|---|---|
| Benzene content of the outflow (by weight) | 21 | 42 | 64 |

It is noticeable that:

the benzene yield increases with the temperature
the benzene yield slightly decreases when the chromium oxide content of the catalyst departs from the preferred values.

The catalysts of Examples I and II have proved to be particularly stable.

EXAMPLE III

This example is given for comparison purposes and forms no part of the invention.

(A) Example I is repeated with the use of a conventional alumina having the following characteristics:

specific surface: 220 m.$^2$/g.
porous volume: 0.7 cc./g.
pores diameter: more than 2,000 A. for 30% of the porous volume.
acidity (at 400° C.): 0.17 calorie/m.$^2$ The catalyst is impregnated in the same manner and contains the same amounts of $Cr_2O_3$ and $K_2O$ as in Example I.

The operating conditions are identical to those of Example I (charge, reaction temperature, VVH . . .).

It is observed that the outflow from the reactor only contains 57% by weight of benzene.

(B) Example I is repeated with the use of the same catalyst as in Example I, and therefore having the same carrier, but not containing potassium oxide.

All other conditions of Example I being unchanged it is observed that the outflow from the reactor contains only 62% (by weight) of benzene.

In both cases it is observed that the proportion of benzene in the outflow decreases with time, which clearly shows that the catalyst is not stable.

EXAMPLE IV

Example I is repeated except that, in the catalyst, $K_2O$ is replaced by 1% by weight of $Na_2O$.

All other conditions being identical to those of Example I, it is observed that the benzene content of the outflow is 66.5%.

EXAMPLE V

This example is given by way of illustration of the activity and the good stability of the catalyst in the presence of charges of alkylaromatic hydrocarbons containing paraffins and olefins.

The catalyst prepared in the same manner as in Example I is used for treating, under the same operating conditions, a charge having the following composition by weight:

|  | Percent |
|---|---|
| Benzene | 1.6 |
| Toluene | 84.95 |
| Ethylbenzene | 1.75 |
| Xylenes | 1.94 |
| Paraffins+olefins (corresponding to a bromine index of 10.1) | 8.76 |
| Heavy polyaromatic hydrocarbons | 1 |

Under these conditions the outflow has the following composition:

|  | Percent |
|---|---|
| Benzene | 54 |
| Toluene | 43 |
| Heavy polyaromatic hydrocarbons | 0.8 |
| Ethylbenzene | 0.75 |
| Xylenes | 0.60 |
| Paraffins+olefins (bromine index null) | 0.85 |

The catalyst has been maintained in operation for six months without substantial loss of activity.

What is claimed as this invention is:

1. A process for hydrodealkylating alkylaromatic hydrocarbons which consists of passing said hydrocarbons over a catalyst in the presence of hydrogen, said catalyst composed of 1 to 20% by weight of compounds of metals from Group I-A and 0.01 to 5% by weight of compounds of metals from Group VI-A deposited on an alumina, said alumina having a specific surface between 40 and 120 m.$^2$/g., a porous volume between 0.4 and 0.8 cc./g., and more than 75% of the porous volume corresponding to pores having a diameter between 100 and 2,000 A., said alumina also exhibiting a substantailly null acidity.

2. A process according to claim 1 wherein the alumina has a specific surface between 40 and 100 m.$^2$/g., and more than 90% of the porous volume corresponds to pores of a diameter between 100 and 2,000 A.

3. A process according to claim 1 wherein the catalyst contains from 5 to 12% by weight of the elements from Group VI-A and from 0.5 to 2% of the elements from Group I-A, these percentages being relative to said oxide form.

4. A process according to claim 1 wherein the metal from Group VI-A is chrominum and the metal from Group I-A is potassium.

5. A process according to claim 1 wherein the catalyst further contains a compound of a metal from the iron group.

6. A process according to claim 1, carried out at a temperature between 500 and 800° C.

7. The process of claim 1 wherein the acidity of the alumina is less than 0.07 calorie per square meter at 400° C. under a reduced pressure of 300 mm. of mercury.

References Cited
UNITED STATES PATENTS

| | | | |
|---|---|---|---|
| 3,178,486 | 4/1965 | Maerker et al. | 260—672 |
| 3,197,518 | 7/1965 | Chapman et al | 260—668 |
| 3,277,197 | 10/1966 | Notari | 260—672 |
| 3,304,340 | 2/1967 | Noll | 260—672 |

DELBERT E. GANTZ, Primary Examiner

G. E. SCHMITKONS, Assistant Examiner

U.S. Cl. X.R.

252—465